United States Patent
Ballegeer et al.

(10) Patent No.: US 10,045,482 B2
(45) Date of Patent: Aug. 14, 2018

(54) RESIDUE DISCHARGE SYSTEM FOR A COMBINE HARVESTER INCLUDING A COVER ASSEMBLY

(71) Applicant: CNH Industrial America LLC, New Holland, PA (US)

(72) Inventors: Stefaan Ballegeer, Beernem (BE); Stefaan Desmet, Vosselare (BE)

(73) Assignee: CNH Industrial America LLC, New Holland, PA (US)

( * ) Notice: Subject to any disclaimer, the term of this patent is extended or adjusted under 35 U.S.C. 154(b) by 122 days.

(21) Appl. No.: 14/988,404

(22) Filed: Jan. 5, 2016

(65) Prior Publication Data

US 2016/0192587 A1 Jul. 7, 2016

(30) Foreign Application Priority Data

Jan. 5, 2015 (BE) .................... 2015/0040

(51) Int. Cl.
*A01D 41/12* (2006.01)
(52) U.S. Cl.
CPC ................. *A01D 41/1243* (2013.01)
(58) Field of Classification Search
CPC ...... A01D 41/1243; A01F 12/40; A01F 29/12
USPC ................ 460/111, 112
See application file for complete search history.

(56) References Cited

U.S. PATENT DOCUMENTS

| | | | | |
|---|---|---|---|---|
| 4,921,469 A * | 5/1990 | Scharf | ................ | A01D 41/1243 460/10 |
| 5,569,081 A * | 10/1996 | Baumgarten | ...... | A01D 41/1243 460/1 |
| 6,729,953 B2 * | 5/2004 | Bueermann | ............. | A01F 12/40 460/112 |
| 6,840,853 B2 * | 1/2005 | Foth | ........................ | A01F 12/40 460/111 |
| 6,939,221 B1 * | 9/2005 | Redekop | ............ | A01D 41/1243 460/111 |
| 6,976,913 B2 * | 12/2005 | Duquesne | .......... | A01D 41/1243 460/111 |

(Continued)

FOREIGN PATENT DOCUMENTS

| | | |
|---|---|---|
| EP | 0212270 A1 | 3/1987 |
| EP | 0993764 A1 | 4/2000 |
| EP | 2384610 A2 * | 11/2011 ......... A01D 41/1243 |

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

A crop residue spreader has a plurality of deflector elements arranged in a first group and a second group, a planar spreader frame element having a bottom surface to which the first and second group of deflector elements are displaceably mounted, the planar spreader frame element comprising a guide slot extending in a direction substantially perpendicular to the longitudinal axis, a first cover plate that is displaceably mounted to a top surface of the planar spreader frame element; a second cover plate that is displaceably mounted to the top surface of the planar spreader frame element and whereby a relative displacement of the first and second cover plates away from each other causes a part of the guide slot to be uncovered and a third cover plate is configured to cover, at least partly, the uncovered part of the guide slot.

15 Claims, 4 Drawing Sheets

(56) References Cited

U.S. PATENT DOCUMENTS

| | | | | |
|---|---|---|---|---|
| 7,156,732 B2 * | 1/2007 | Kuhn | ................ | A01D 41/1243 460/111 |
| 7,487,024 B2 * | 2/2009 | Farley | ................ | A01D 41/1243 701/50 |
| 8,010,262 B2 * | 8/2011 | Schroeder | .......... | A01D 41/1243 701/50 |
| 2015/0351322 A1 * | 12/2015 | Desmet | ............. | A01D 41/1243 460/114 |

* cited by examiner

US 10,045,482 B2

RESIDUE DISCHARGE SYSTEM FOR A COMBINE HARVESTER INCLUDING A COVER ASSEMBLY

This application claims priority to Belgium Application BE2015/0040 filed Jan. 5, 2015, which is incorporated herein by reference in its entirety.

FIELD OF THE INVENTION

The invention relates to the field of combine harvesters and more specifically to residue discharge systems, also know as crop residue spreaders, that are applied in such harvesters.

BACKGROUND OF THE INVENTION

At present, agricultural harvesting machines such as combine harvesters typically include a residue discharge system for propelling crop residue onto a harvested field. The crop residue may typically include stalks, leaves and cobs separated from corn or maize; straw and chaff separated from wheat and other grasses; and stalks, leaves and pods of legumes such as soybeans. In many instances it is desirable for the crop residue to be spread as evenly as possible over the full width of the harvested crop, matching the header size.

Such even spreading may e.g. be hindered by cross-winds occurring during the harvesting.

In order to address this, known crop residue spreaders typically comprise a plurality of deflectors, or distributors, for projecting the crop residue in a particular direction, whereby an orientation of such deflectors or distributors may be adjusted by a adjustment mechanism, depending on the wind direction.

In known arrangements, it has been found that such an adjustment may be rendered difficult as crop residue may become stuck or clogged in the adjustment mechanism.

SUMMARY OF THE INVENTION

It would be desirable to provide an improved crop residue spreader, whereby a risk of clogging of the crop residue is reduced.

To address this, in an aspect of the invention, a crop residue spreader for a combine harvester is provided, the crop residue spreader comprising:

a plurality of deflector elements arranged in a first group and a second group, a planar spreader frame element having a bottom surface to which the first and second group of deflector elements are displaceably mounted, the first and second group of deflector elements being mounted on opposite sides of a longitudinal axis of the crop residue spreader, the planar spreader frame element comprising a guide slot extending in a direction substantially perpendicular to the longitudinal axis;

a first cover plate that is displaceably mounted to a top surface of the planar spreader frame element, the first cover plate being connected to the first group of deflector elements via connecting members extending through the guide slot and being configured to, at least partly, cover the guide slot;

a second cover plate that is displaceably mounted to the top surface of the planar spreader frame element, the second cover plate being connected to the second group of deflector elements via connecting members extending through the guide slot and being configured to, at least partly, cover the guide slot;

whereby a relative displacement of the first and second cover plates away from each other causes a part of the guide slot to be uncovered; the crop residue spreader further comprising a third cover plate configured to cover, at least partly, the uncovered part of the guide slot.

In accordance with the present invention, a crop residue spreader is provided. Such a crop residue spreader may, during normal use, be mounted to a combine harvester for spreading crop residue such as chopped stalks or straw over a harvested field.

The crop residue spreader according to the present invention comprises a plurality of deflector elements that are arranged in a first group and a second group. Such deflector elements are configured to receive a flow of crop residue, e.g. provided by a chopper of the combine harvester, and deflect the flow or crop residue such that it substantially spans the width of the harvesting header of the harvester.

In accordance with the present invention, the deflector elements are arranged in two groups which can be displaced or oriented independently of each other. This provides in arrangements that enable to direct or redirect portions of the flow of crop residue to particular parts of the harvested field, thereby taking into account possible disturbances caused by the wind. An independent control of displacement or positioning of both groups further enables to control or set the width of the spread crop residue.

In accordance with the present invention, the crop residue spreader further comprises a planar spreader frame element having a bottom surface to which the first and second group of deflector elements are displaceably mounted, whereby the first and second group of deflector elements are mounted on opposite sides of a longitudinal axis of the crop residue spreader.

The planar spreader frame element is a substantially planar structure to which the groups of deflector elements are displaceably mounted. During use, the planar spreader frame element may be mounted to a combine harvester in a substantially horizontal position, the groups of deflector elements being arranged underneath the planar spreader frame element, i.e. mounted to a bottom surface of the frame element.

Within the meaning of the present invention, reference to the longitudinal axis refers to the longitudinal axis of the harvester to which the crop residue spreader is mounted during use.

The planar spreader frame element of the crop residue spreader according to the present invention further comprises a guide slot extending in a direction substantially perpendicular to the longitudinal axis. This guide slot enables a positioning of the groups of deflector elements.

In accordance with the present invention, the first and second groups of deflector elements are respectively coupled to first and second cover plates, the cover plates being displaceably mounted to the top surface of the planar spreader frame element and connected to the groups of deflector elements via connecting members that extend through the guide slot.

In such an arrangement, a displacement of the cover plates, e.g. by means of actuators, enables a displacement of the deflector elements that are mounted to the bottom surface of the planar spreader frame element. The cover plates further serve to cover, at least partly, the guide slot, thus avoiding that crop residue gets stuck in the guide slot. However, the guide slot may not be covered entirely when the detector elements are positioned in extreme positions, i.e. when the cover plates are moved away from the longitudinal axis. In such position, part of the guide slot located near the longitudinal axis becomes uncovered. When this part of the guide slot would get filled with crop residue, it would be difficult to reposition the deflector elements as it would be difficult to move the cover plates and connected deflector elements back inwards, i.e. towards the longitudinal axis. In particular, it would be difficult to reach the position whereby the deflector elements are brought back to the most inward position.

In order to avoid such filling, the crop residue spreader according to the present invention comprises a third cover plate, configured to, at least partly cover part of the guide slot that is not covered by the first or second cover plate.

In a preferred embodiment, the third cover plate is configured to substantially cover the entire guide slot part that is not covered by the first or second cover plate.

In an embodiment, the third cover plate is displaceable along the longitudinal axis. In such embodiment, the third cover plate may be arranged to fill or occupying part of the space between the first and second cover plates when they are moved away from the longitudinal axis.

In an embodiment, the crop residue spreader according to the present invention comprises an actuator assembly for displacing the first and second cover plates.

Alternatively, or in addition, the cover plates may be provided with handles for manually displacing the cover plates, thereby positioning the deflector elements.

By appropriate shaping of the first, second and third cover plates, the third cover plate can be arranged to substantially fill a gap or space between the first and second cover plates when they are moved away from the longitudinal axis. In such arrangement, the first, second and third cover plates may be arranged in plane with each other. In such embodiment, the third cover plate may be positionable by means of a spring mechanism (e.g. including a gas spring or a coil spring), the spring mechanism providing in a preload force to the third cover plate, thereby maintaining the third cover plate in contact with the first and second cover plate and closing the gap between the first and second cover plate, irrespective of the distance between the first and second cover plate.

Alternatively, or in addition, the crop residue spreader may be provided with an actuator for displacing the third cover plate.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
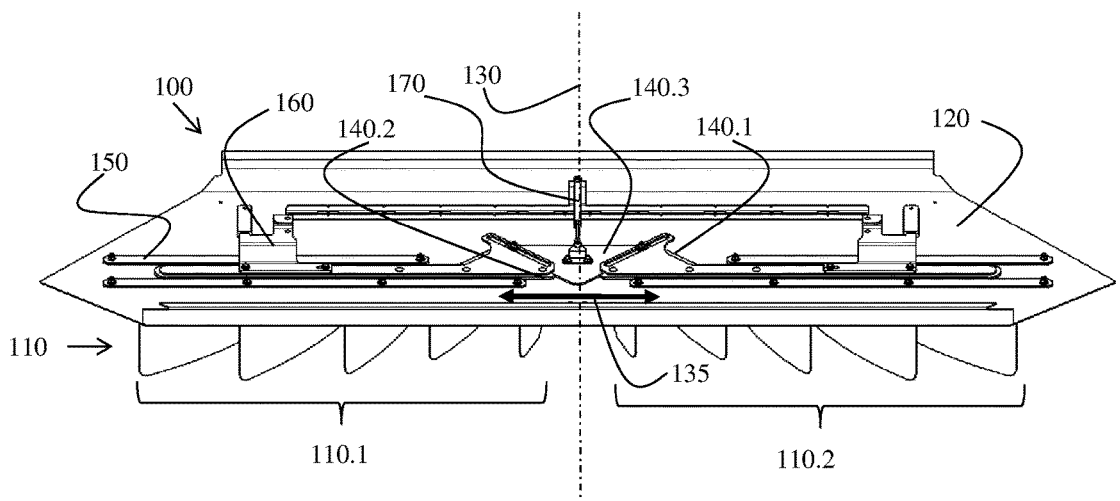
FIG. 1 depicts a frontal view of a crop residue spreader according to an embodiment of the present invention.

FIG. 1 depicts a front view of a crop residue spreader 100 according to the present invention. The crop residue spreader 100 as shown comprises a plurality of deflector elements 110 mounted to a bottom surface of a planar spreader frame element 120. The deflector elements are arranged in a first group 110.1 and a second group 110.2 that are arranged on opposite sides of a longitudinal axis 130 of the crop residue spreader 100. FIG. 1 further shows a first 140.1 and second 140.2 cover plate mounted to a top surface of the planar spreader frame element 120. The cover plates 140.1 and 140.2 extend in a direction substantially perpendicular to the longitudinal axis 130 and are displaceable in said direction, indicated by the arrow 135. In the embodiment as shown, guiding members 150 are provided for guiding the first and second cover plates 140.1 and 140.2 when they displace in the direction perpendicular to the longitudinal axis. FIG. 1 further shows a pair of handles 160 for displacing the cover plates 140.1, 140.2.

FIG. 1 further shows a third cover plate 140.3 that is displaceably mounted to the top surface of the planar spreader frame element 120. In the embodiment as shown, the third cover plate 140.3 is a wedge-shaped plate that is mounted to the planar spreader frame element 120 by means of a spring, in particular a gas spring 170, which is configured to exert a pre-load force onto the third cover plate 140.3 such that it maintains contact with the first and second cover plate 140.1, 140.2, thereby covering the space between the first and second cover plate 140.1, 140.2.

Figure 2:
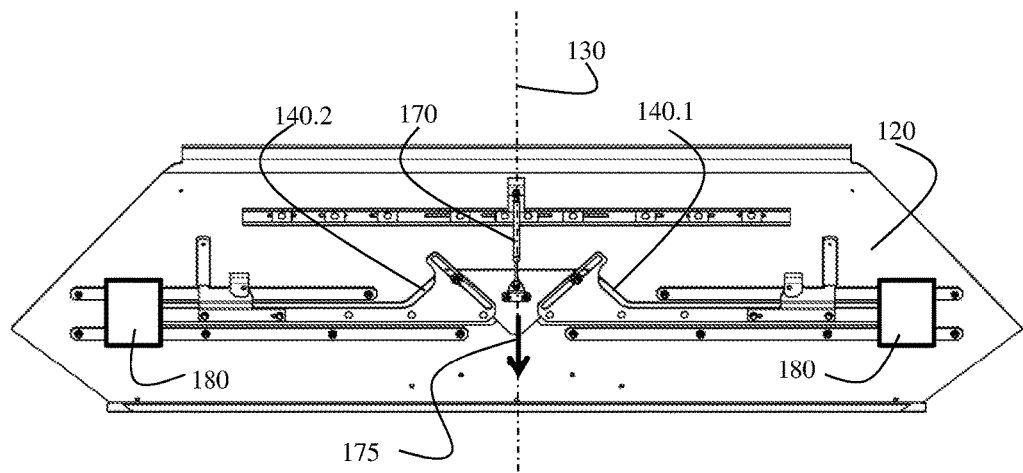
FIG. 2 depicts a top view of the crop residue spreader as shown in FIG. 1.

FIG. 2 schematically shows a top view of the embodiment of the crop residue spreader of FIG. 1, showing the planar spreader frame element 120, the first, second and third cover plates 140.1, 140.2 and 140.3 and the gas spring 170. FIG. 2 further schematically shows a pair of actuators 180 of an actuator assembly, the actuator assembly being configured to displace the first and second cover plates in a direction substantially perpendicular to the longitudinal axis 130. In an embodiment, the actuators 180 may e.g. include electromagnetic actuators such as linear electromagnetic actuators or spindle type actuators. Other types of actuators such as hydraulic or pneumatic actuators could however be applied as well. In the embodiment as shown, the first, second and third cover plates are arranged in plane. As such, when the actuators 180 of the actuator assembly displace the first and second cover plates inwards, i.e. towards the longitudinal axis, the first and second cover plates may push the third cover plate along the longitudinal axis, against the pre-load force exerted by the gas spring 170.

As will be acknowledged by the skilled person, an inverse arrangement of the spring 170 and actuator assembly 180 may be considered as well. In such arrangement, an actuator may be provided to displace the third cover plate substantially along the longitudinal axis, together with a spring mechanism configured to exert a pre-load force onto the first and second cover plate, the pre-load force being directed substantially perpendicular to the longitudinal axis and towards the longitudinal axis. In such arrangement, the actuator exerting a force on the third cover plate actually controls the position of the first and second cover plate as well. In the arrangement as shown in FIG. 2, when the third cover plate is pushed downward, i.e. in the direction as indicated by the arrow 175, the first and second cover plates are pushed outward, i.e. away from the longitudinal axis, thereby positioning the groups of deflector elements connected to the first and second cover plates.

Figure 3:
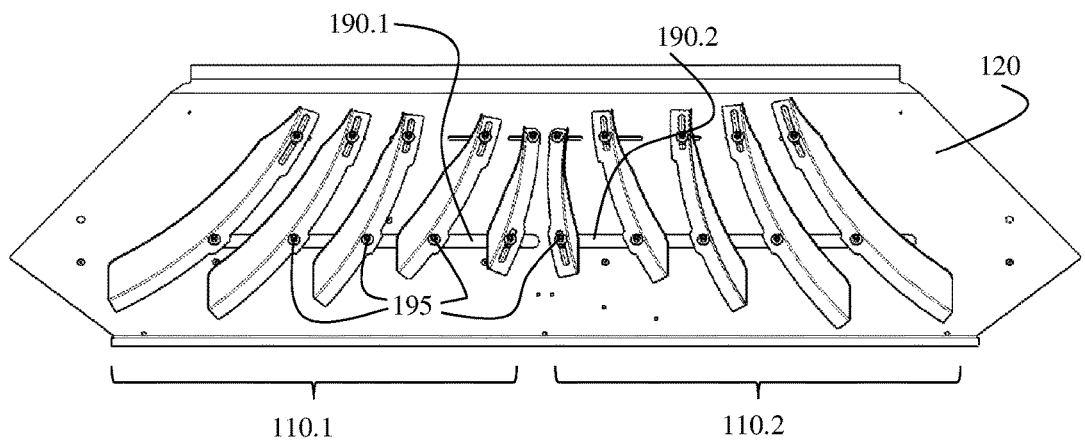
FIG. 3 depicts a bottom view of the crop residue spreader as shown in FIG. 1.

FIG. 3 schematically shows a bottom view of the embodiment of the crop residue spreader of FIG. 1, showing the planar spreader frame element 120 and the first and second group of deflector elements 110.1 and 110.2. FIG. 3 further shows two guide slots 190.1, 190.2 configured to guide connection members 195 connecting the deflector elements 110.1, 110.2 to the respective cover plates 140.1, 140.2.

As an alternative to using two guide slots for respectively guiding the connecting members 195, a single guide slot that spans the combined width of the guide slots 190.1 and 190.2 may be used as well. When a single guide slot is used, the first and second group of deflector elements 110.1 and 110.2 may be brought closer together (thereby reducing the width about which the crop residue is spread) compared to an arrangement having separate slots. Using a pair of guide slots may however be beneficial with respect to the bending strength of the planar spreader frame element 120.

In an embodiment, the third cover plate (140.3) is thus configured to displace, by means of a force exerted on it, in response to a relative displacement of the first and second cover plates (140.1, 140.2), in a direction substantially parallel to the longitudinal axis (130), in order to cover, at least partly, an uncovered part of the guide slot (190.1, 190.2). In such embodiment, the first and second cover plates may e.g. be displaced by means of an actuator assembly 180, whereas the third cover plate is displaced by means of a spring such as a gas spring. In an alternative embodiment, a relative displacement of the first and second cover plates (140.1, 140.2) may be realized, in response to a displacement of the third cover plate (140.3), thereby moving the first and second cover plates away from each other or towards each other. In such embodiment, the first and second cover plates may e.g. be displaced by means of a spring mechanism, whereas the third cover plate is displaced by means of an actuator.

Figure 4:
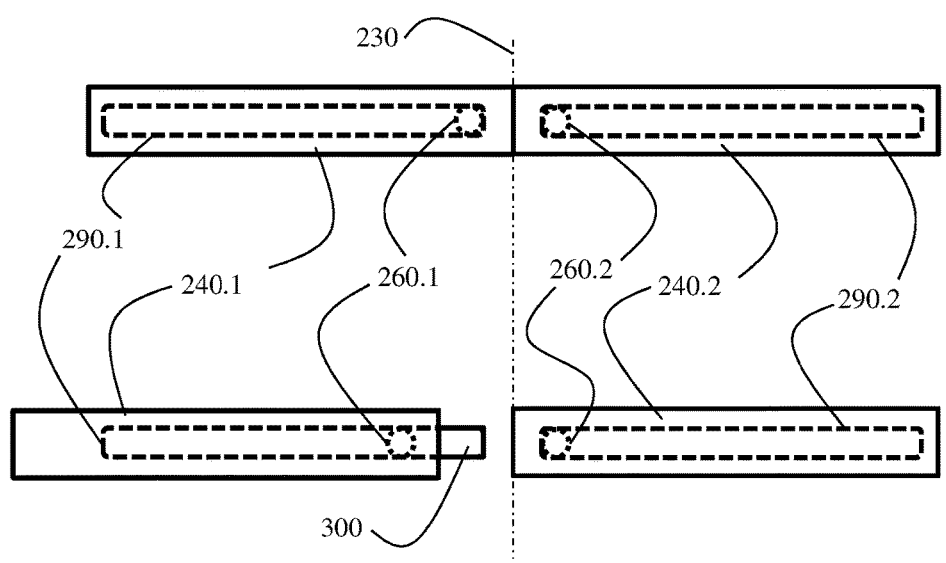
FIG. 4 depicts an arrangement of two cover plates and corresponding guide slots as known in the art.

FIG. 4 schematically shows a top view of a first and second cover plate 240.1, 240.2, including a pair of guide slots 290.1, 290.2 for two different positions of the cover plates.

The top part of FIG. 4 shows the cover plates 240.1 and 240.2 touching each other. In this position, the deflector elements (not shown) are arranged to spread the crop residue over a comparatively small width. Note that in FIG. 4, circles 260.1 and 260.2 represent connecting members connecting the detector elements of each of the two groups of deflector elements that are closest to the longitudinal axis 230. These connecting elements thus connect the cover plates 240.1, 240.2 to the innermost deflector elements of each of the groups of deflector elements, innermost referring to a position closest to the longitudinal axis 230.

The bottom part of FIG. 4 shows the first cover plate 240.1 in a more outward position, resulting in an uncovering of part of the guide slot 290.1, i.e. the part indicated by reference number 300.

It has been devised by the inventors that such partial uncovering of the guide slot may result in the guide slot becoming clogged with crop residue. As a consequence, the repositioning of the cover plate, e.g. the cover plate 240.1 as shown in the bottom part of FIG. 4, to a more inward position, e.g. back to the position as shown in the top part of FIG. 4, is compromised or rendered difficult, due to the presence of the crop residue in the guide slot.

Note that similar problems may occur when only a single guide slot is applied.

In order to avoid or mitigate the problem as illustrated in FIG. 4, the present invention applies a third cover plate to cover, at least partly, any uncovered part of the one or more guide slots that are applied.

Figure 5:
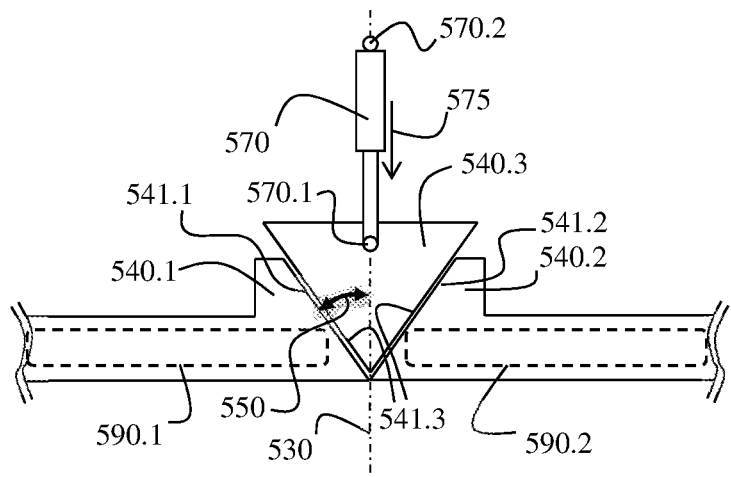
FIGS. 5-7 schematically show and an arrangement of first, second and third cover plates as can be applied in crop residue spreader according to an embodiment of the present invention.

FIG. 5 schematically shows a position of the first 540.1, second 540.2 and third 540.3 cover plate of an embodiment of the present invention, when the first and second cover plates 540.1, 540.2 are in the most inward position, inward referring to a position towards the longitudinal axis 530. In this position, the guide slots 590.1 and 590.2 are covered by respective first and second cover plates 540.1 and 540.2. FIG. 5 further shows a spring mechanism 570, in particular a gas spring, for exerting a force (indicated by the arrow 575) to push the third cover plate 540.3 towards the first and second cover plates. At one end 570.1, the spring mechanism is connected to the third cover plate 540.3, the other end 570.2 of the spring member being connected to the planar spreader frame element (not shown) to which the cover plates are mounted.

In the embodiment as shown, the first and second cover plates have an edge 541.1, 541.2 arranged at a non-zero angle 550 with respect to the longitudinal axis 530. As such, a gap or spacing is provided between the first and second cover plates due to the edges being at a non-zero angle 550 with respect to the longitudinal axis 530.

As can be seen, the third cover plate 540.3 has a pair of edges 541.3 facing the edges 541.1, 541.2 of the first and second cover plates.

In the arrangement as shown, the pair of edges 541.3 can be considered to define a wedge shape, configured to fill the gap between the first and second cover plates. In the arrangement as shown, the edges 541.3 of the third cover plate are substantially parallel to the edges 541.1, 541.2 of the first and second cover plates, thus enabling the space or gap between the first and second cover plate 540.1, 540.2 to be closely covered by the third cover plate 540.3.

In a preferred embodiment, the non-zero angle is within a range from 30° to 60°, preferably 45°.

Figure 6:
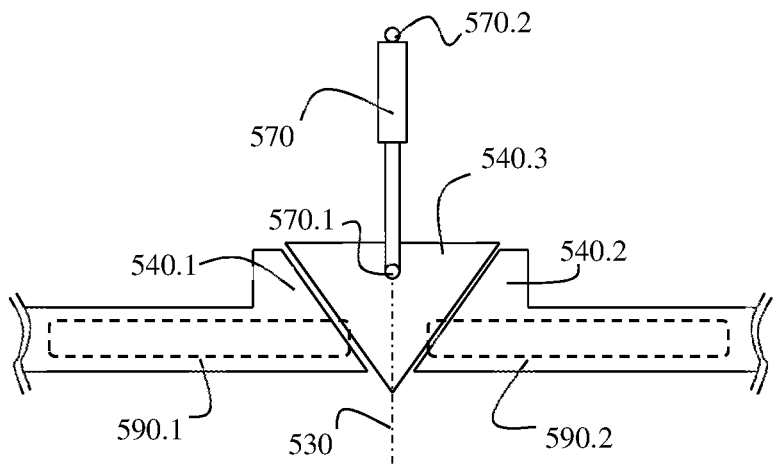

FIG. 6 schematically shows another position of the first 540.1, second 540.2 and third 540.3 cover plate of an embodiment of the present invention, whereby the first and second cover plates 540.1, 540.2 are in a more outward position. Due to the spring mechanism 570 exerting a force on the third cover plate, this third cover plate is moved to fill the gap generated by the outward (i.e. away from the longitudinal axis 530) displacement of the first and second cover plates 540.1 and 540.2. Note that the displacement of the first and second cover plates as shown in FIG. 6 is a substantially symmetrical displacement. As such, the displacement made by the third cover plate 540.3 is a displacement along the longitudinal axis 530.

Figure 7:
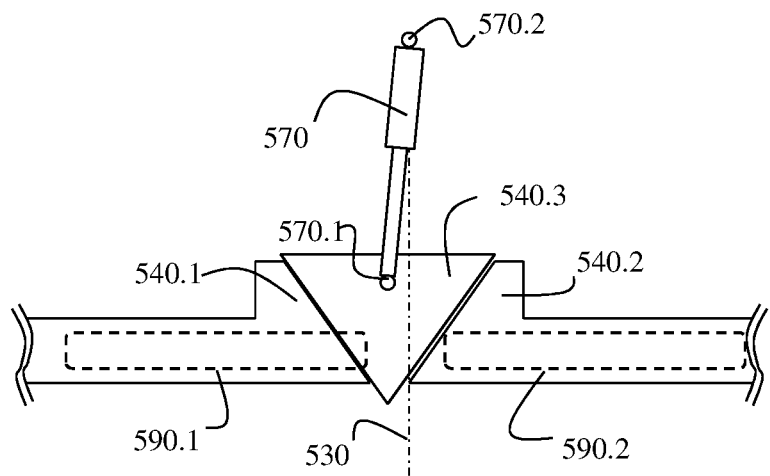

FIG. 7 schematically illustrates a non-symmetrical displacement of the first and second cover plate 540.1, 540.2. In order to ensure that the gap or space between the first and second cover plate remains filled or covered by the third cover plate, it may be advantageous to ensure that the spring mechanism is pivotably mounted to both the third cover plate and the planar spreader frame element. As can be seen from FIG. 7, by connecting the spring mechanism to both the third cover plate and the planar spreader frame element using pivotable connections 570.1 and 570.2, one can ensure that the third cover plate covers the gap or space between the first and second cover plate, irrespective of whether the displacement of the first and second cover plates is symmetrical or not, with respect to the longitudinal axis.

In the embodiment shown in FIGS. 5, 6 and 7, an actuator assembly is assumed to displace the first and second cover plates, whereas a spring 570, in particular a gas spring, is applied to maintain the third cover plate 540.3 in close contact with the first and second cover plates. As discussed above, an inverse arrangement as discussed above in FIG. 2 may be applied as well.

Furthermore, an arrangement whereby the position of each of the first, second and third cover plates is controlled by means of an actuator or a plurality of actuators may be considered as well.

With respect to the displacement of the first and second cover plates relative to the third cover plate, it may be advantageous to ensure that the edges, e.g. the edges 541.1, 541.2 and 541.3 as shown in FIG. 5 have a comparatively low coefficient of friction. Alternative, a bearing may be provided to enable a substantially frictionless displacement of the first and second cover plates relative to the third cover plate.

Figure 8:
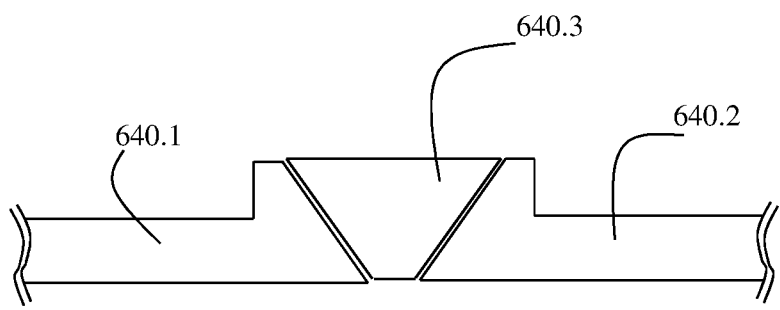
FIG. 8 schematically show and an arrangement of first, second and third cover plates, whereby the third cover plate has a non-triangular shape.

Further, in the embodiments as shown, the third cover plate has an apex where the edges 541.3 meet (see e.g. FIG. 5). It should be noted that alternative embodiments may be applied as well, as e.g. schematically shown in FIG. 8. FIG. 8 schematically shows an arrangement of first and second cover plates 640.1 and 640.2 and a third cover plate 640.3 configured to cover an area or space between the first and second cover plates. A position of the first, second and third cover plates as shown may be controlled in a similar manner as discussed above.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. A crop residue spreader for a combine harvester, comprising:
    a plurality of deflector elements arranged in a first group and a second group,
    a planar spreader frame element having a bottom surface to which the first and second group of deflector elements are displaceably mounted, the first and second group of deflector elements being mounted on opposite sides of a longitudinal axis of the crop residue spreader, the planar spreader frame element comprising a first guide slot and a second guide slot each extending in a direction substantially perpendicular to the longitudinal axis;
    a first cover plate that is displaceably mounted to a top surface of the planar spreader frame element, the first cover plate connected to the first group of deflector elements via connecting members extending through the first guide slot and being configured to, at least partly, cover the first guide slot;
    a second cover plate that is displaceably mounted to the top surface of the planar spreader frame element, the second cover plate connected to the second group of deflector elements via connecting members extending through the second guide slot and being configured to, at least partly, cover the second guide slot;
    whereby a relative displacement of the first and second cover plates away from each other causes a part of the first guide slot to be uncovered and a part of the second guide slot to be uncovered; wherein a third cover plate is configured to cover, at least partly, each uncovered part of the first guide slot and second guide slot.

2. The crop residue spreader according to claim 1, wherein the third cover plate is configured to displace, in response to the relative displacement of the first and second cover plates, in a direction substantially parallel to the longitudinal axis to cover, at least partly, each uncovered part of the first and second guide slots.

3. The crop residue spreader according to claim 1, wherein the crop residue spreader comprises an actuator configured to displace the third cover plate to at least partly cover each uncovered part of the first and second guide slots.

4. The crop residue spreader according to claim 3, further comprising a spring mechanism configured to exert a pre-load force onto the first and second cover plate, the pre-load force being directed substantially perpendicular to the longitudinal axis and towards the longitudinal axis.

5. The crop residue spreader according to claim 4, wherein the spring mechanism comprises a first and second spring for exerting the pre-load force respectively onto the first and second cover plate.

6. The crop residue spreader according to claim 5, wherein the first and second spring include a gas spring or a coil spring.

7. The crop residue spreader according to claim 1, further comprising an actuator assembly configured to displace the first and second cover plate in the direction substantially perpendicular to the longitudinal axis.

8. The crop residue spreader according to claim 7, further comprising a spring configured to exert a pre-load force onto the third cover plate, the pre-load force being directed substantially parallel to the longitudinal axis.

9. The crop residue spreader according to claim 1, wherein the first, second and third cover plates are arranged in plane.

10. The crop residue spreader according to claim 1, wherein the first and second cover plates have a first and second edge respectively, the first and second edge being arranged at a non-zero angle with respect to the longitudinal axis.

11. The crop residue spreader according to claim 10, wherein the third cover plate has a pair of edges facing the first and second edges of the first and second cover plates.

12. The crop residue spreader according to claim 11, wherein the third cover plate includes a wedge shape defined by the pair of edges.

13. The crop residue spreader according to claim 10, wherein the non-zero angle is within a range from 30° to 60°.

14. The crop residue spreader according to claim 11, wherein the non-zero angle is 45°.

15. The crop residue spreader according to claim 1, wherein the third cover plate is pivotably mounted to the planar spreader frame element.

* * * * *